Sept. 17, 1957 R. F. CHRISTY ET AL 2,806,819
LIGHT WATER MODERATED NEUTRONIC REACTOR
Filed Jan. 9, 1946 3 Sheets-Sheet 1

Inventors:
Alvin M. Weinberg
Robert F. Christy

Sept. 17, 1957 R. F. CHRISTY ET AL 2,806,819
LIGHT WATER MODERATED NEUTRONIC REACTOR
Filed Jan. 9, 1946 3 Sheets-Sheet 2

Sept. 17, 1957    R. F. CHRISTY ET AL    2,806,819
LIGHT WATER MODERATED NEUTRONIC REACTOR
Filed Jan. 9, 1946    3 Sheets-Sheet 3

United States Patent Office 2,806,819
Patented Sept. 17, 1957

2,806,819

LIGHT WATER MODERATED NEUTRONIC REACTOR

Robert F. Christy, Santa Fe, N. Mex., and Alvin M. Weinberg, Oak Ridge, Tenn., assignors to the United States of America as represented by the United States Atomic Energy Commission Application January 9, 1946, Serial No. 640,100

2 Claims. (Cl. 204—193.2)

The present invention relates to atomic power plants, and more particularly to a neutronic reactor composed of uranium and light water ($H_2O$).

In neutronic reactors, a thermal neutron fissionable (herein called merely "fissionable" in accordance with the terminology now commonly employed in the art) isotope such as $U^{233}$, $U^{235}$ or $94^{239}$ or mixtures thereof is subjected to nuclear fission by absorption of slow neutrons, and a self-sustaining chain reaction is established by the neutrons evolved by the fission. In general such reactors may comprise bodies of compositions containing such fissionable material, such as, for example, natural uranium, containing .7% of $U^{235}$ disposed in a regular geometrical pattern known as a lattice in a neutron slowing material or moderator. Graphite, beryllium and heavy water are typical moderators suitable for such use. Heat is evolved during the fission reaction and is customarily removed by circulating a coolant in heat exchange relationship with the uranium. In such reactors, the transuranic element 94 (plutonium), is formed as a byproduct of the reaction. Specific details of the theory and essential characteristics of such reactors are set forth in the copending application of Enrico Fermi and Leo Szilard, Serial No. 568,904, filed December 19, 1944, now Patent 2,708,656.

In reactors using natural uranium disposed in lattice arrangement in graphite, beryllium or heavy water, the aggregation of the uranium so reduced loss of neutrons at resonance energies in the $U^{238}$ content of the element, that a chain reaction could readily be attained in a reactor of practical size. However, the neutron capture cross section of light water ($H_2O$) is so high that even with aggregation with optimum volume ratio of uranium to a light moderator water, the neutron reproduction ratio in a system of infinite size, known as the factor K, would not be sufficiently over unity to permit a smaller system, that is, a system of finite and practical size to be built, and still be able to sustain a chain reaction with a reproduction ratio of unity or better. This fact follows, because there could be no external neutron loss in a system of infinite size, whereas in any system of finite size there will be an exterior neutron leakage. For a given lattice and materials, the leakage will increase as the device is made smaller. Any such leakage causes neutrons to be lost to the chain reaction and reduces the reproduction ratio that can be obtained in the structure to be built. Thus, a lattice having a K factor of unity cannot support a chain reaction in a reactor of finite size.

However, with proper aggregation of natural uranium in an ordinary water moderator, and with the proper volume ratio of one to the other, resonance losses are reduced to such an extent that the K factor of a uranium-$H_2O$ lattice closely approaches unity. By taking advantage of the reduction of resonance absorption by aggregating the uranium in light water, and then increasing the amount of fissionable isotope in the uranium only slightly over that obtained in natural uranium, it has been found that a K factor above unity can be obtained and that a self-sustaining chain reaction will occur in a neutronic reactor of practical size even though the fissionable isotope content is less than 1%, when this "enriched" uranium is immersed in light water ($H_2O$) as a moderator. The term water, as used hereafter in this specification, will be used to refer only to light water.

Uranium may be termed enriched when the fissionable isotope content is above that occurring in natural uranium. In this respect, percentage enrichment is referred to as the relative increase in the amount of fissionable isotope present in the uranium over that occurring in nature. Natural uranium contains .7% $U^{235}$. A 20% enriched uranium will contain .84% of $U^{235}$ or equivalent isotope, 50% enrichment will contain 1.05% of the fissionable isotope, and 100% enrichment will bring up the fissionable isotopic content only to 1.4%. Thus, it can be seen that even with enrichments up to 100%, the uranium will still contain less than 1½% of a fissionable isotope.

It is an object of the present invention to provide a means and method of creating a self-sustaining chain reaction in a composition of uranium and water when the fissionable isotope content of the uranium is only slightly over that occurring in natural uranium, preferably an enrichment to less than 2% total fissionable isotope in the uranium.

Uranium enriched only to the slight degree above referred to cannot, without aggregation in specific geometries and volume ratios, be used in conjunction with water as a moderator to support a chain reaction in a reactor of practical size.

It is, therefore, another object of the present invention to provide a means and method of dispersing slightly enriched uranium in water so that a self-sustaining chain reaction can be obtained in a neutronic reactor of practical size.

The use of $H_2O$ as a moderator in a neutronic reactor is highly desirable for many reasons. It is cheap, readily available, and can serve when lattice type compositions are used to support the reaction, both as moderator, and as coolant to remove the heat of reaction. As the root mean square distance a neutron has to move between birth as a fission neutron to death by absorption as thermal energy is the shortest in water of all of the above-mentioned moderators, the critical size of the reactor where the reproduction ratio is unity, for a given K factor will also be the smallest.

Enrichment of natural uranium in $U^{235}$ can be accomplished, for example, by a diffusion barrier isotope separation process wherein natural uranium hexafluoride ($UF_6$) is passed in gaseous form through a plurality of porous barriers. The lighter isotope passes through such barriers more readily than the heavier isotope, and progressive enrichment occurs as the heavier isotope is held back. Enrichments of $UF_6$ to 2% $U^{235}$ can readily be obtained. The enriched $UF_6$ is then changed to $UF_4$ by a hydrochloric acid treatment, reduced to massive uranium metal by reaction in a bomb with magnesium, and the resultant metal cast, extruded, or otherwise worked and machined into bodies of the size and shape desired.

In addition, natural uranium can be enriched by adding to natural uranium other fissionable isotopes such as $U^{233}$ and $94^{239}$. $U^{233}$ is formed as the result of neutron absorption in thorium. $94^{239}$ is formed in any neutronic reactor wherein uranium$^{238}$ is present, by neutron absorption therein and subsequent beta decay. Both $U^{233}$ and $94^{239}$ can be obtained in high concentration and purity and added to natural uranium as desired. As used herein, therefore, the term enriched uranium is to be understood as meaning $U^{238}$ combined with more than .7% of any of the fissionable isotopes, or mixtures thereof.

The above objects and advantages of the present invention will be more fully understood from the following detailed description read by reference to the drawings, wherein.

Figure 1:
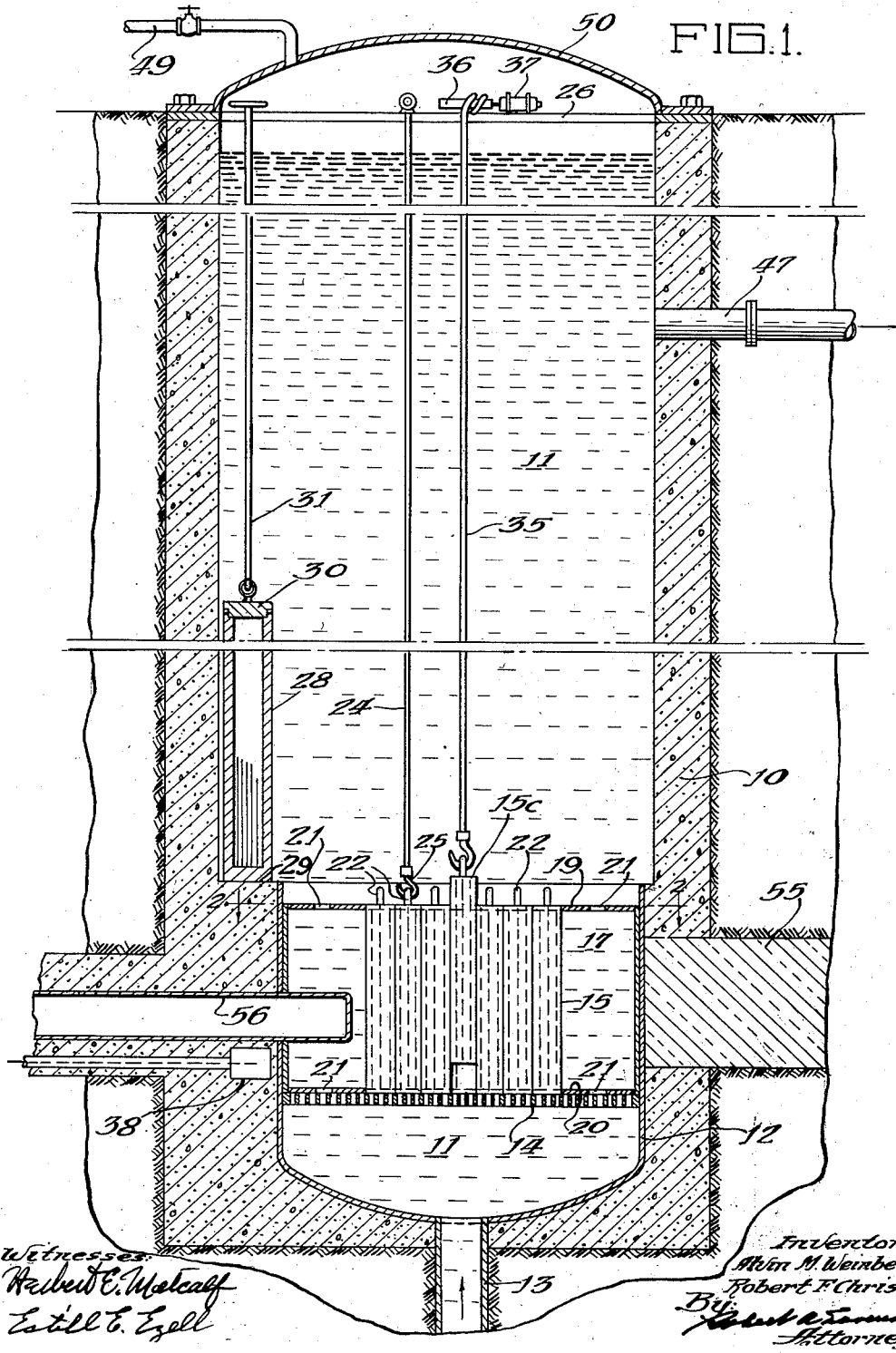
Fig. 1 is a diagrammatic vertical sectional view, partly in elevation, of an illustrative neutronic reactor system embodying the present invention.
Figure 2:
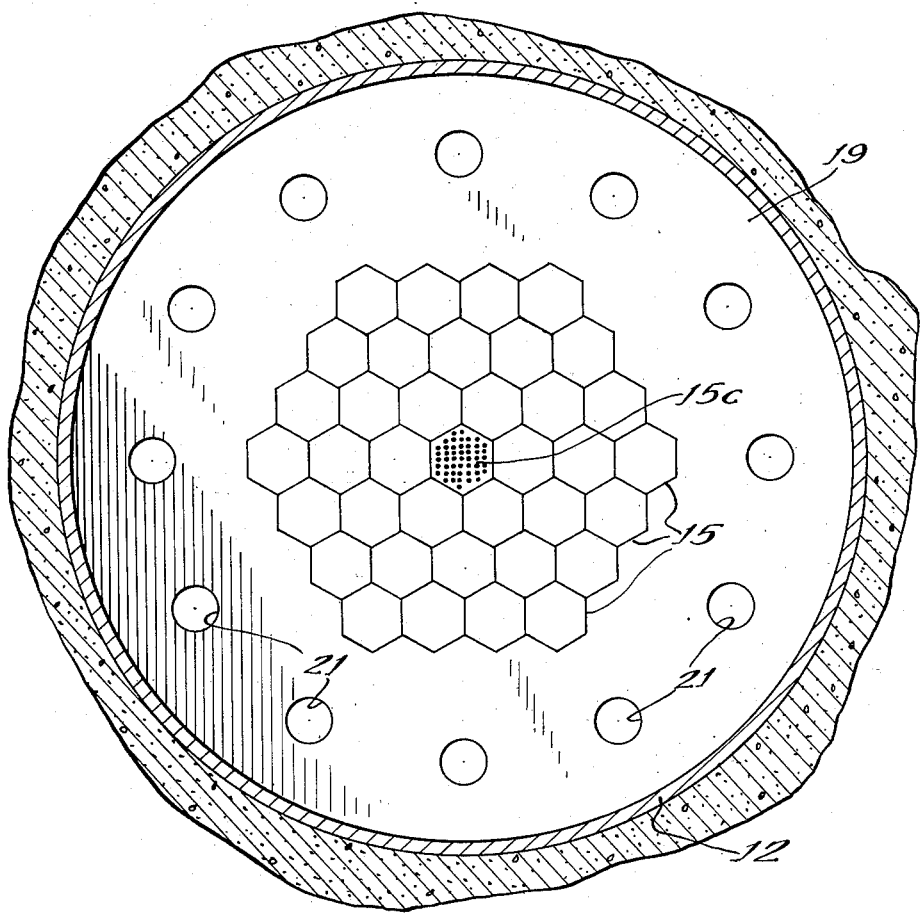
Fig. 2 is an enlarged cross-sectional view taken as indicate by the line 2—2 in Fig. 1.
Figure 3:
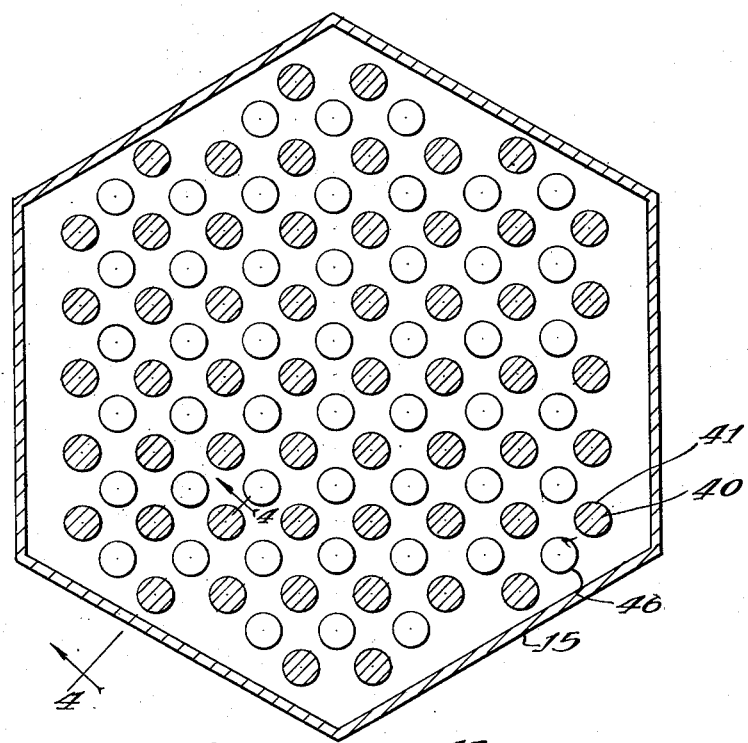
Fig. 3 is a cross-sectional view through a tube containing a rod type lattice used in the device of Fig. 1.

Referring to Figs. 1 and 2 illustrating a light water moderated neutronic reactor having a lattice of only slightly enriched uranium, concrete walls 10 define a pit 11 of circular cross-section in the bottom portion thereof, this bottom portion being lined with a tank 12 having a lower cooling water inlet 13.

Positioned well above the bottom of tank 12 is an apertured supporting grid 14 on which is supported a plurality of hexagonal loosely fitted aluminum tubes 15 grouped in the center of the pit space 11, as shown in Fig. 2. A space is thus provided between the group of tubes 15 and the tank 12 to form a reflecting layer 17 of water when the pit is filled therewith.

Tubes 15 are set into top and bottom spacer plates 19 and 20, respectively, these plates being provided with apertures 21 to provide water flow through the reflecting layer 17, in lesser amount however than will pass through tubes 15. Tubes 15 are provided on top with handles 22 by which they can be removed from the pit by use of a removal rod 24 having a lower hook 25 thereon engageable with a handle 22. Rod 24 extends to a platform 26 across the top of the pit.

When removed, tubes 15 are placed in a coffin 28 formed from a radioactivity shielding material such as lead, for example, and disposed on ledge 29 in pit 11 above the reactor structure. Coffin 28 is provided with a bayonet or pin locked cover 30 operated by coffin rod 31 by which the coffin, with its enclosed tube can be removed when desired when the cover is locked in place.

A central tube 15c is vertically movable as by cable 35, drum 36 and motor 37, the latter two structures being mounted on platform 26. Control of the reaction is obtained by insertion of more or less of the central tube 15c into the reaction zone as defined by the grouped tubes. The reactivity of the reactor, and the neutron density developed therein, is monitored by ionization chamber 38 inserted adjacent the periphery of the reactor reflector.

Figure 4:
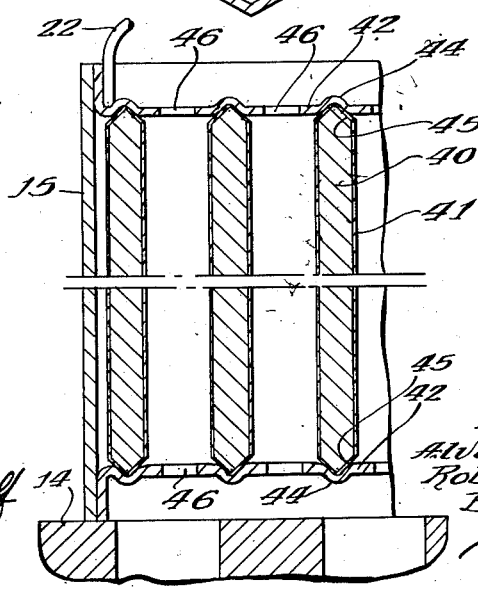
Fig. 4 is a vertical cross-sectional view taken as indicated by the line 4—4 in Fig. 3.

The uranium lattice used inside each tube 15 in a preferred embodiment comprises spaced uranium rods 40 protected from corrosion by thin aluminum jackets 41. The mounting system for the rods 40 is shown in Fig. 4. The top and bottom of each tube 15 is closed by supporting end cap plates 42 having dimples 44 fitting coned ends 45 of the uranium rods 40 thus holding the rods parallel and in proper lattice spacing in accordance with the volume ratio of moderator to uranium desired. End cap plates 42 are perforated with apertures 46 between the dimples 44 so that a clear water flow past all the rod surfaces is obtained when water is forced upwardly through the tubes 15. The number of tubes 15 used, and the dimensions of the reaction zone formed by the grouped rods 40 will depend on the degree of enrichment, as given in later tables. The grouped tubes 15 with rods 40 therein form a substantially continuous lattice throughout the group.

Above the reaction zone, the pit 11 may hold up to 50 ft. of water, as controlled by the depth of the pit, the position of an upper water outlet 47, and internal pressure as determined by air inlet 49 into a pressure head 50 sealing the top of the pit 11. This arrangement permits the reactor to be operated under pressure as desired, to prevent boiling of the moderator around the rods at high power. The depth of water over the reactor acts as an upper radiation shield.

One of the uses for a reactor of the presently described type, particularly in the smaller sizes, is as a source of neutrons of high density. To this end, a thermal neutron column 55 of graphite bricks, for example, is extended laterally from tank 12. All neutrons leaving this column will be reduced to thermal energy by passage through the graphite and the external surface thereof can be used as a source of thermal neutrons for nuclear physics research.

On another side of the reactor, a thimble 56 extends laterally through the water reflector 17 almost to the lattice. Fast neutrons can enter this thimble, and pass outwardly along the thimble and through the exterior opening thereof to provide fast neutrons for nuclear research. Furthermore, materials to be subjected to high density neutron irradiation can be placed inside thimble 56 and irradiated close to the lattice.

In operation, the reaction zone is provided with sufficient rods 40 in proper spacing so that a neutron reproduction ratio of unity is obtained with the central control tube 15c partly withdrawn from the reaction zone. Then by insertion of the control tube further into the reactor a reproduction ratio of greater than unity can be obtained. The neutron density then rises exponentially. When the desired power has been reached, the control tube 15c is withdrawn until the reproduction ratio is again unity. The attained power is thus stabilized. In the meantime, water circulation is maintained through the reactor and the reflecting zone by circulation between inlet 13 and outlet 47 and the heat of reaction is carried away. Once-through water is preferable, as when fresh water is used, no great amount of radioactivity is formed therein and no fission products enter the coolant stream due to the aluminum jackets 41 on the rods 40. However, pumps re-circulating the water can be used if desired. The amount of water used will, of course, depend on the power output at which the reactor is to operate, as will the pressure. At powers of 10,000 kw. and above, a pressure of 10 atmospheres is preferred to be maintained in the reaction zone.

Having described the physical structure of a device embodying the present invention, the nuclear physics thereof will next be discussed.

A neutronic reactor, wherein the reactive composition is natural uranium, will support a chain reaction when the moderator is $D_2O$ but not when $H_2O$ is used. This is because the ratio of neutron capture cross-section to neutron scattering cross-section of $H_2O$ is much higher than $D_2O$, the best presently known values being as follows:

Light water ($H_2O$) _____ .00478
Heavy water ($D_2O$) _____ .00017

Because of this fact, if natural uranium is disposed in $H_2O$ as a slurry, for example, of uranium oxide, the K factor for the composition would only be about .85. However, by aggregation or lumping of the uranium into metal rods or spheres with a volume ratio of approximately 1 uranium metal to 2 water, a K factor of .99 has been found when the rods or spheres were on the order of 2 cm. in diameter. Due to the close spacing of the lumps, there is little practical advantage in the use of spheres over rods, and rods are much easier to mount in a liquid moderator than spheres. The use of aggregation alone, therefore, raises K from about .85 in a slurry to just short of unity when metal rods or spheres are used. To obtain a K of unity with a slurry, it would have to be enriched about 40% in its fissionable isotope content. However, even then no reactor of practical size could be constructed, as K should be at least 1.03 to permit external leakage enough for reduction to practical size. At this K factor the slurry should have to contain uranium enriched 46%.

However, only a very slight enrichment is needed when rod or sphere geometry is used, and the following values will illustrate the trend for neutronic reactors of practical size when rod radius=.9 cm. and sphere radius=1.0 cm. and where the lumps are bare.

*Spherical reactors (without reflector)*

| Reactor Radius, cm. | K | Enrichment, percent | Abundance, percent | Uranium Mass, tons |
|---|---|---|---|---|
| ∞ | 1.00 | 4 | .73 | ∞ |
| 140 | 1.03 | 10 | .78 | 64 |
| 76 | 1.10 | 25 | .89 | 11.5 |
| 62 | 1.16 | 40 | 1.00 | 6.12 |
| 35 | 1.50 | 180 | 2.00 | 1.07 |

Volume ratio $H_2O$-$U$=approximately 2.

It will be seen from the above that only a 4% enrichment of the aggregated uranium will provide a composition having a K of unity whereas a 40% enrichment of the uranium, when in a slurry form, is required to obtain the same K factor.

However, in many cases, a cylindrical reactor lends itself better for practical construction, and the following values are given for cylindrical reactors with the height (H) equal to diameter (without reflector):

| Radius, cm. | H, cm. | K | Enrichment, percent | Abundance, percent | Mass U (tons) |
|---|---|---|---|---|---|
| ∞ | ∞ | 1.00 | 4 | .73 | ∞ |
| 129 | 258 | 1.03 | 10 | .78 | 72.4 |
| 70 | 140 | 1.10 | 25 | .89 | 13.2 |
| 57 | 114 | 1.16 | 40 | 1.00 | 7.03 |
| 32 | 64 | 1.50 | 180 | 2.00 | 1.23 |

When, as in the present instance, a water reflector at least 30 cm. thick is positioned around all sides of the reactive composition, the reactors can be reduced in size. The table below gives values for reactors having a water reflector formed as a continuation outwardly of the water moderator:

| Radius, cm. | H, cm. | K | Enrichment, percent | Abundance, percent | Mass U (tons) |
|---|---|---|---|---|---|
| 121 | 242 | 1.03 | 10 | .78 | 59.6 |
| 62 | 124 | 1.10 | 25 | .89 | 9.20 |
| 49 | 98 | 1.16 | 40 | 1.00 | 4.47 |
| 24 | 48 | 1.50 | 180 | 2.00 | .520 |

For a graphite reflector positioned outside of a tank containing the lattice, the above dimensions can be again reduced by about 10%. Neutronic reactors of the type described are fully operative at low powers where little heat is developed in the uranium when the rods are used without coatings. Corrosion in such cases can be reduced by using the water at low temperatures, and by polishing or bright annealing the rods. However, for higher power outputs sealed aluminum jackets applied or bonded to the rods are preferred with the lattice sectionalized in aluminum tubes. In this case, about .02% K is lost by neutron absorption in the aluminum. This absorption can be compensated for either by raising the enrichment slightly or by enlarging the reactor to reduce the exterior loss by an amount corresponding to the aluminum loss.

When a substantial power output is to be taken from a reactor of the type described herein, such as, for example, 10,000 kw. or more, a reactor from 60 to 100 cm. in radius is preferred in order that power may be properly dissipated.

It can be seen from the above figures that a reactor utilizing uranium metal having only a 10% enrichment is of practical size, and in fact contains no more uranium than some natural uranium-graphite reactors and considerably less than most high power reactors of that type. In addition, when enrichment bringing the fissionable isotope content up to 2% is used, only .520 ton of uranium is required when a reflector is used. At a 2% abundance of the fissionable isotope, this amount of uranium will contain only 6.71 kg. of the fissionable isotope.

The figures given above for rod and sphere radii and for volume ratio are optimum values. Departure can be made from these values without greatly altering the amount of fissionable isotope, and it has been found that with lumping radii from between .5 cm. to 1 cm. can be used, with volume ratios of from 1.7 to 2.5 without the required enrichment rising over about 40% (1.00% abundance) for a reactor well within practical size.

It is also to be clearly noted from the above, that the invention as herein described and claimed permits a neutronic reactor to be built in practical sizes with a light water moderator when the uranium is enriched by a fissionable isotope to an abundance of over .78% and not over 2% in $U^{235}$, and that by combining aggregation with enrichment of the uranium such reactors can be built of uranium and light water which otherwise cannot support a chain reaction without much higher enrichment and use of much larger quantities of the reactive metals.

What is claimed is:

1. A neutronic reactor comprising a plurality of parallel spaced $U^{235}$ enriched uranium rods having between 0.78% and 2.00% abundance of $U^{235}$, the rods being 1.8 cm. in diameter, the total mass of uranium rods being between 59.6 tons and 0.520 ton, a light water moderator, the volume ratio of the moderator to uranium rods being two, the uranium rods being submerged in the moderator, the rods and the moderator being disposed in the shape of a cylinder having height equal to diameter wherein the diameter is between 242 cm. and 48 cm., and a light water reflector at least 30 cm. thick disposed to surround the cylinder on all sides.

2. A neutronic reactor comprising a plurality of parallel spaced $U^{235}$ enriched natural uranium rods having 0.89% abundance of $U^{235}$, the rods being 1.8 cm. in diameter, the total mass of the uranium rods being 9.20 tons, a light water moderator, the volume ratio of the moderator to uranium rods being two, the uranium rods being submerged in the moderator, the rods and moderator being disposed in the shape of a cylinder having height equal to diameter wherein the diameter equals 124 cm., and a light water reflector at least 30 cm. thick disposed to surround the cylinder on all sides.

References Cited in the file of this patent

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Roberts et al.: Journal of Applied Physics, article entitled "Uranium and Atomic Power," vol. 10, 1939, pp. 612 to 614.

Chemical Abstracts, 34, 7734 (1940). Abstract of publication by Zel'dovich et al., in J. Exptl. Theoret. Phys. (U. S. S. R.) 10, 29-36 (1940).

"A General Account of the Development of Methods of Using Atomic Energy for Military Purposes," by H. D. Smyth, pub. August 1945, pp. 21, 22, 23, 24, 25, 26, 27.

Smythe: A General Account of the Development of Methods of Using Atomic Energy for Military Purposes, August 1945, p. 75.

Goodman: "The Science and Eng. of Nuclear Power," vol. I, p. 275, Addison-Wesley (1947).

Kelly et al.: Phy. Rev. 73, 1135-9 (1948).